(12) United States Patent
Azumi et al.

(10) Patent No.: US 7,214,422 B2
(45) Date of Patent: May 8, 2007

(54) GLASS-BREAK PREVENTING FILM LIKE FILTER AND PLASMA DISPLAY APPARATUS

(75) Inventors: Yukiko Azumi, Osaka (JP); Yoshihiro Hieda, Osaka (JP); Yuuichi Morimoto, Osaka (JP); Toshitsugu Hosokawa, Osaka (JP); Kazuhiko Miyauchi, Osaka (JP)

(73) Assignee: Nitto Denko Corporation, Ibaraki-shi, Osaka (JP)

(*) Notice: Subject to any disclaimer, the term of this patent is extended or adjusted under 35 U.S.C. 154(b) by 0 days.

(21) Appl. No.: 10/288,441

(22) Filed: Nov. 6, 2002

(65) Prior Publication Data
US 2003/0104210 A1 Jun. 5, 2003

(30) Foreign Application Priority Data
Nov. 7, 2001 (JP) ............................ P2001-341501

(51) Int. Cl.
B32B 27/18 (2006.01)
B32B 33/00 (2006.01)
H01K 1/26 (2006.01)

(52) U.S. Cl. ...................... 428/331; 428/332; 428/343; 428/411.1; 313/110; 313/112

(58) Field of Classification Search ................ 313/110, 313/112; 524/445; 428/411.1, 454, 331, 428/332, 343
See application file for complete search history.

(56) References Cited

U.S. PATENT DOCUMENTS
4,375,910 A * 3/1983 Seki ............................ 359/484
6,541,557 B1 * 4/2003 Hasegawa et al. ........... 524/413
6,580,674 B1 * 6/2003 Nishiyama et al. ..... 369/112.01

FOREIGN PATENT DOCUMENTS
EP       0 846 661 A2    6/1998
EP       1 134 072 A2    9/2001
JP       9-259770       10/1997
WO       WO 01/16627 A1 * 3/2001

OTHER PUBLICATIONS
English language translation of WO 01/16627 A1, Mar. 2001.*
European Search Report dated Jul. 11, 2005.

* cited by examiner

Primary Examiner—Ramsey Zacharia
(74) Attorney, Agent, or Firm—McGinn IP Law Group, PLLC (57) ABSTRACT

The invention is to offer a glass-break preventing film like filter to be directly attached to a visual side of a plasma display plate, so that no problem occurs of double images caused owing to an air layer, contributing to easy attachment, light weighing, thin size and low cost, and a plasma display apparatus attached with the same. A glass-break preventing film like filter is composed by laminating a reflection preventing film on one side of a glass-break-preventing layer comprising a composite material of a transparent organic high polymer substance and an organized layer like clay, and making the other side an adhesive face, and a plasma display apparatus is composed by directly attaching on a visual side thereof with the glass-break preventing film like filter via the adhesive face of the glass-break preventing layer.

18 Claims, 1 Drawing Sheet

GLASS-BREAK PREVENTING FILM LIKE FILTER AND PLASMA DISPLAY APPARATUS

The present application is based on Japanese Patent Application No. 2001-341501, which is incorporated herein by reference.

BACKGROUND OF THE INVENTION

1. Field of the Invention

The present invention relates to a glass-break preventing film like filter and a plasma display apparatus attached with the same.

2. Description of the Related Art

Figure 3:
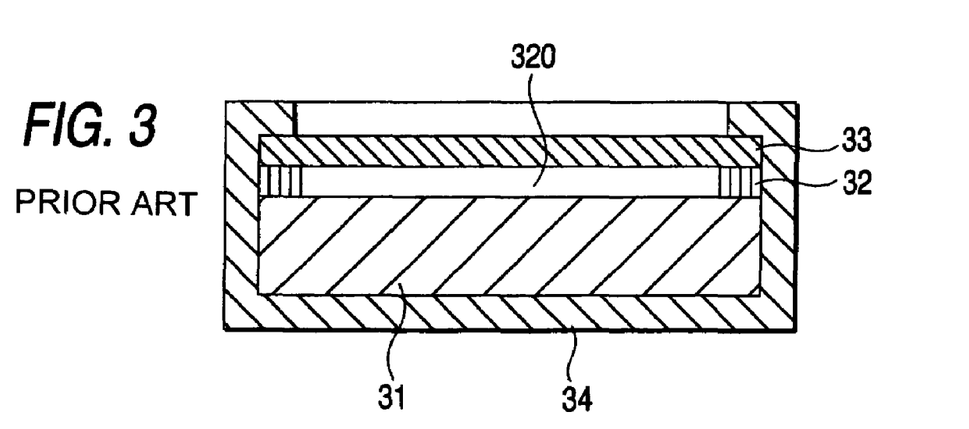
FIG. 3 shows a cross sectional view showing an example of the related art.

A conventional plasma display apparatus is, as shown in FIG. 3, formed with a space 320 by a spacer 32 at a visual side of a plasma display plate 31, in which a transparent front plate 33 of a glass plate of around 3 mm thickness is arranged and disposed within a case 34. With this structure arranged with the transparent front plate 33 via the space 320, it is possible to prevent an external shock from directly attacking the plasma display plate 31, and suppress a heat generated in the plasma display plate 31 from transmitting to the transparent front plate 33.

However, a problem is present that an image is reflected in double owing to an air layer formed by the space 320 and refraction of light at a boundary between the plasma display plate 31 and the transparent front plate 33. Further, another problem occurs that the transparent front plate 33 has an around 3 mm thickness so as to stand against the external shock, so that weight is heavy and cost is high.

On the other hand, applicant of this invention already proposed, in Unexamined Japanese Patent Publication No. He. 9-259770, a plasma display apparatus characterized by directly attaching the transparent protective plate at a visual side of the plasma display plate via a heat resistant transparent sheet having a buffering property and an adhesive property. According to this display apparatus, there is no air layer at the visual side, exhibiting an excellent effect avoiding the problem of the double image.

Nevertheless, in the above proposal, since a hard and thick glass plate or an acrylic plate is employed as the transparent protective plate, an operation of attaching this plate to the plasma display plate via the plasma display sheet is not easy. Thus, the glass plate is still involved with problems of weight or cost. In a regard of the impact resistance, the above proposal is not sufficient, and merely judges the impact resistance with impact force (about 0.0294 J) when dropping a steel ball of 3 g weight from a height of 1 mm. For wasting display units, though removing the transparent protective plate for re-cycling, removing is not easy.

SUMMARY OF THE INVENTION

In view of such circumstances, it is objects of the invention to offer a glass-break preventing film like filter where an air layer is removed by directly attaching it to the visual side of the plasma display plate without causing the problem of the double image, and the attaching is easy, contributing to light weighing, thin size and low cost, and bringing about a large glass-break preventing effect of the plasma display plate, to offer the glass-break preventing film like filter which can be easily taken away after having been attached to the plasma display plate from the viewpoint of re-cycling, and to offer a plasma display apparatus attached with these film like filters.

For accomplishing the above objects, inventors made earnest studies and reached a completion of this invention, in which, according to the film like filter where a reflection preventing film is laminated on one side of a specific glass-break preventing layer comprising a composite material of a transparent organic high polymer substance and an organized lamellar clay mineral with the other side made an adhesive face, the film like filter can be directly attached to the plasma display plate by pasting through use of the adhesive face, thereby heightening the shock resistance of the display apparatus and increasing the glass-break preventing effect, and because of directly attaching, no problem is present of the double image by the air layer, and further since the transparent protective plate as the hard and thick glass plate or the acrylic plate is not employed, the attachment is easy contributing to the lightweight, thin size and low cost of the display apparatus, and with the structure of making the adhesive side having the removability, the inventors knew that the removal after having been attached was possible.

That is to say, the invention relates to the glass-break preventing film like filter, characterized by laminating a reflection preventing film on one side of a glass-break preventing layer comprising a composite material of a transparent organic high polymer substance and an organized lamellar clay mineral, and making the other side an adhesive face. In particular, the invention is to offer the glass-break preventing film like filter of the above mentioned structure, wherein the organic high polymer substance has a dynamic storage shearing elastic modulus at 20° C. being $6 \times 10^6$ Pa or less; the glass-break preventing layer has a thickness of 0.1 to 5 mm; the adhesive face of the glass-break preventing layer has removability; and its transmissivity of total light is 80% or more.

Furthermore, the invention relates to a plasma display apparatus, characterized in that a plasma display plate is directly attached on a visual side thereof with the glass-break preventing film like filter via the adhesive face of the glass-break preventing layer.

Features and advantages of the invention will be evident from the following detailed description of the preferred embodiments described in conjunction with the attached drawings.

DETAILED DESCRIPTION OF THE PREFERRED EMBODIMENTS

Explanation will be made to embodiments with reference to the attached drawings.

Figure 1:
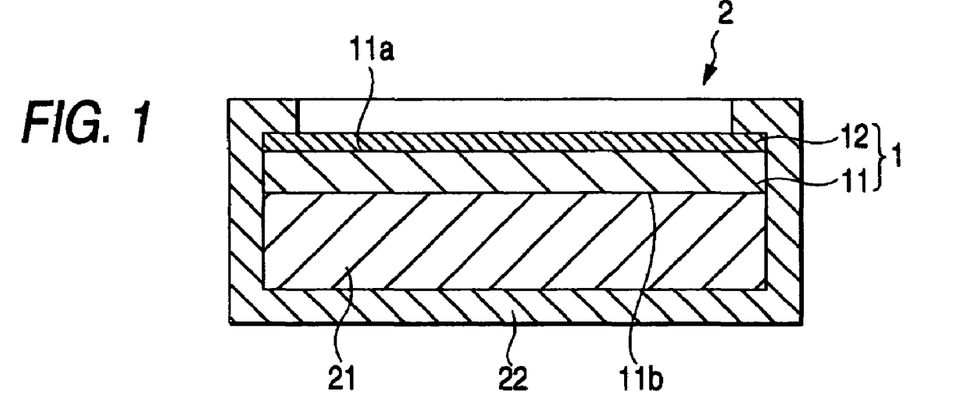
FIG. 1 shows a cross sectional view showing one example of the glass-break preventing film like filter according to the invention and the plasma display apparatus attached with the same.

FIG. 1 shows one embodiment of the glass-break preventing film like filter and the plasma display apparatus attached with the same.

In the drawings, the glass-break preventing film like filter 1 comprises such a structure of laminating a reflection preventing film 12 on one side 11a of a glass-break preventing layer 11 and an organized lamellar clay mineral, and making the other side 11b an adhesive face. Further, the plasma display apparatus 2 comprises a structure where the plasma display plate 21 is directly attached on a visual side thereof with the glass-break preventing film like filter 1 via the adhesive face of the glass-break preventing layer 11, in short, directly attached via the adhesive face of the glass-break preventing layer 11 and disposed within a case 22.

In the glass-break preventing film like filter 1, the glass-break preventing layer 11 comprises the composite material of the transparent organic high polymer substance and the organized lamellar clay mineral, and this has of course an excellent transparency (light transmissivity) not hindering the visual property of the plasma display plate 21 (e.g., the glass-break preventing layer 11 does not cause double images, is devoid of birefringent properties, etc.), desirably absorbs and moderates external shock so as to effectively prevent the plasma display plate 21 from the glass breaking.

In the above composite material, the transparent organic high polymer substance is a transparent organic high polymer resin or rubber capable of film forming process, and is sufficient with a substance capable of dispersing an organized lamellar clay mineral. Particularly desirable substances are dynamic storage shearing elastic modulus at 20° C. being $6 \times 10^6$ Pa or less (practically, $1 \times 10^5$ to $1 \times 10^3$ Pa). If using the organic high polymer substance having the dynamic storage shearing elastic modulus and forming the glass-break preventing layer 11 comprising the composite material of the organic high polymer and the organized lamellar clay mineral, it is possible to desirably absorb and moderate the external shock and to effectively prevent the plasma display plate 21 from the glass breaking.

As to such organic high polymer substances, employed are polyurethane, polyester or acrylic based resins, or rubber as natural rubber or butyl rubber. Among them, the acrylic resin is especially useful in view of heat resistance, moisture resistant reliability, transparency, workability or affinity with organized lamellar clay mineral.

As to the organized lamellar clay mineral, the lamellar clay mineral is subjected to an organizing treatment to improve the affinity with the organic high polymer substance, and ordinarily it is obtained by ion-exchanging a convertible inorganic ion of the lamellar clay mineral with an organic onium ion. The lamellar clay mineral includes smectite based clay mineral such as montmorillonite, saponite or hectorite, vermiculite, halloysite or expansible mica. A cation exchanging amount of the lamellar clay mineral is desirably set within a range of 50 to 200 meq/100 g in view of the affinity with the organic high polymer substance to be intercalated between the layers.

The organic onium ion used to the ion exchange includes ammonium ion, pyridinium ion, sulfonium ion, or phosphonium ion, and especially an organic ammonium ion. As the organic ammonium ion, there are enumerated alkylamine hydrochloride where organic amine such as do-decylamine, tetra-decylamine, hexa-decylamine, or octa-decylamine is made cation with hydrochloric acid, or quaternary ammonium salt such as tetra-alkylammonium salt.

The organized lamellar clay mineral is formed by ion-exchanging the convertible inorganic ion of sodium or magnesium of the lamellar clay mineral with the organic onium ion, and at this time, it is preferable to use the organic onium ion of equivalent amount to cation exchanging amount of the lamellar clay mineral. For a solvent when ion-exchanging, protic solvent as water or alcohol is desirably used in view of dispersion of the lamellar clay mineral.

The thus obtained organized lamellar clay mineral has a structure where the organic onium ion is intercalated between silicate layers as a main component of the lamellar clay mineral and absorbed to a silicate surface by ionic interaction, so-called intercalation structure. With this structure, the organic high polymer substance is easily invited between the silicate layers. This intercalated structure can be pursued by determining enlargement of distance between the layers by X-ray scattering analysis of wide angle or narrow angle or by determining organic amount by a thermogravimetric analysis.

In the organic lamellar clay mineral having such an intercalated structure, desirably the amount of the organic onium ion is usually 20 to 70 wt %. Being less than 20 wt %, polarity between the layers is too high to invite the organic high polymer substance, while being more than 70 wt %, the organic onium ion much exists in the composite material to lower the heat resistance.

The composite material of the organic high polymer substance and the organic lamellar clay mineral can be prepared by ① a method of fusing and kneading the organic high polymer substance and the organic lamellar clay mineral in a fusing kneader such as a 1-axis or 2-axes extruder, 2-piece roll or a kneader, ② a method of scattering and mixing the organic high polymer substance and the organic lamellar clay mineral in an organic solvent having good affinity with both components, and then removing the organic solvent only, and ③ a method of intercalating parts of a monomer for forming the organic high polymer substance and a polymerization initiator between the layers of the organic lamellar clay mineral to effect a polymerizing reaction by action of heat or light under a condition of the intercalated condition for producing the composite material of the organic high polymer substance and the clay mineral.

Among them, according to the ③ method, the scattering property of the organic lamellar clay mineral is good in the composite material to desirably provide the composite material excellent in transparency. Explanation will be made to a method of preparing the composite material of an acrylic group resin as the organic high polymer substance and the organic clay like clay mineral following the ③ method.

This method in advance adds an external action to, e.g., a mixture comprising an acrylic group monomer, the polymerization initiator, the organic lamellar clay mineral and the organic solvent, intercalates parts of the monomer and the polymerization initiator between the layers of the organic lamellar clay mineral, then removes the solvent, and carries out the polymerizing reaction. In this method, a separation occurs at the layers of the clay mineral by the acrylic group resin generated between the layers of the clay mineral, and such a composite material is produced which is composed of a composite of the acrylic group resin and the clay mineral and maintains high transparency.

The acrylic group monomer is used in combination with monoethylene unsaturated monomer having a main component of (meth) acrylic acid alkyl ester and being as needed capable of copolymerization therewith. As (meth) acrylic acid alkyl ester, preferably used is monofunctional unsaturated (meth) acrylate of non-tertiary alkyl alcohol, and it is selected from those having from 2 to 14 carbon atoms of alkyl group. Specifically, listed are ethyl (meth) acrylate, butyl (meth) acrylate, isoamyl (meth) acrylate, n-hexyl (meth) acrylate, 2-ethylhexyl (meth) acrylate, isooctyl (meth) acrylate, isononyl (meth) acrylate, decyl (meth) acrylate, or dodecyl (meth) acrylate, and one or more than two kinds are used.

If the monoethylene unsaturated monomer being capable of copolymerization with this (meth) acrylic acid alkyl ester is copolymerized with said (meth) acrylic acid alkyl ester, it is used for heightening or improving the heat resistance or the adhesive property by introducing the functional group or the polarity group. Specifically, listed are acrylic acid, itaconic acid, sulfopropyl acrylate, hydroxyalkyl acrylate, cyanoalkyl acrylate, acrylic amide, substitute acrylic amide, N-vinyl caprolactam, acrylonitrile, 2-methoxy ethyl acrylate, acrylic acid glycygl, vinyl acetate, N,N-dimethylaminoethyl acrylate, or N-vinylpyrolidone.

As to the using rate of the monoethylene unsaturated monomer being capable of copolymerization with said (meth) acrylic acid alkyl ester, the (meth) acrylic acid alkyl ester as the main component is 70 to 100 wt %, preferably 85 to 100 wt %, the monoethylene unsaturated monomer capable of copolymerization therewith is 30 to 0 wt %, preferably 15 to 0 wt %. Being within this range, the adhesive property and the heat resistance may be well balanced.

The organic lamellar clay mineral is desirably used 10 to 150 wt parts per 100 wt parts of the above acrylic group monomer. Thereby, the organic lamellar clay mineral is usually 10 to 150 wt parts for 100 wt parts of the acrylic group resin generated by the polymerizing reaction, so that it is possible to produce the composite material having the high transparency and the large glass-break preventing effect. On the other hand, if the organic lamellar clay mineral is small, the glass-break preventing effect is short, and if being excessive, the transparency goes down.

The polymerization initiator includes a photo-poly-merization initiator or a thermal-polymerization initiator.

The photopolymerization initiator is an initiator issuing a radical by light, and specifically, benzoin ethers such as benzoin methyl ether or benzoin isopropyl ther; substituted benzoin ethers such as anizoin methyl ether; substituted acetophenones such as 2,2-diethoxy acetophenone or 2,2-dimethoxy-2-phenoneacetophenone; substitution-α-ketols such as 2-methyl-2-hydroxypropiophenone, aromatic sulfonyl chlorides such as 2-naphthalenesulfonyl chloride; or photo-active oximes such as 1-phenone-1,1-propanedione-2-(o-ethoxy-carbonyl).

The thermopolymerization initiator is an initiator issuing a radical by heat, and specifically, there are azo group compounds such as azobisisobutyronitrile, or organic peroxides, and in particular, if using organic peroxides, good effects are brought about to the adhesive force and the cohesive force. The organic peroxides include benzoyl peroxide, cumene hydro peroxide, or lauroyl peroxide.

The amounts of these polymerization initiators are appropriately selected in response to kinds thereof within the range of 0.005 to 5 wt parts per 100 wt parts of the acrylic group monomer. The photopolymerization initiator is desirably 0.005 to 1 wt part, especially 0.05 to 0.5 wt parts. Being too small, non-reacted monomers much remain after the photo polymerization and are ready for generating air bubbles at the adhered boundaries, while being too much, the photo-polymerization initiator remains in the photo polymer, causing yellow. For the above mentioned reason, the thermopoly-merization initiator is preferably 0.01 to 5 wt parts, especially 0.05 to 3 wt parts.

The organic solvent dissolves the acrylic group monomer and the polymerization initiator to make these substances easy to intercalate between the layers of the organic lamellar clay mineral, and after intercalation the organic solvent is taken away by reducing pressure or heating prior before subjecting to the polymerizing reaction. By accelerating the intercalation, even if the clay mineral is very much used, this is desirably scattered in the acrylic group resin generated by the polymerizing reaction, enabling to produce the composite material compatible at high degree in the transparency and the glass-break preventing effect.

As such an organic solvent, those are sufficient with substances having capacity to wet and swell organized lamellar clay mineral and capacity dissolve the acrylic group monomer, and being easily taken away by reducing pressure or heating, and no limitation is especially made to kinds. Typical are toluene, xylene, acetone, methyl ethyl ketone, ethyl acetate, methanol or ethanol. Among them, toluene and ethyl acetate are preferable. The using amount of the organic solvent is determined in response to the using amount of the organized lamellar clay mineral, and ordinarily 50 to 1000 wt parts for 100 wt parts of the organized lamellar clay mineral.

The mixture comprising the acrylic group monomer, polymerization initiator, organized lamellar clay mineral and organic solvent is given the external action for intercalating parts of the monomer, the polymerization initiator and the organic solvent between the layers of the clay mineral, and preferable as the external force is a shearing external action or a vibrating external action. As the shearing external action, there is a method of giving a high shearing force to a dispersing liquid composed of the above mixture, for example, dispersing by means of a colloid mill, a homogenizer or a disper. Further, for the vibrating external action, there is a method of vibrating the dispersing liquid by means of a very strong supersonic homogenizer.

As external actions other than the above mentioned, a thermal or pressing external actions maybe added. The thermal external action includes a method of treating the dispersing liquid by heating at temperatures of not exceeding boiling points of the monomer or the organic solvent. The pressing external action includes methods of effecting pressure of around 1 to 5 $Kg/cm^2$ to the dispersing liquid supported in an autoclave, or carrying out the treatment as a medium of a supercritical carbon dioxide.

If intercalating parts of the acrylic group monomer, the polymerization initiator and the organic solvent between the layers of the organized lamellar clay mineral, a distance between the layers of the organized lamellar clay mineral is enlarged normally more than 100 A. The enlargement of the distance between the layers can be quantitatively analyzed by a wide angled or a narrow angled X-rays scattering analysis. Further, this can be confirmed indirectly and quantitatively by improving the transparency of the scattering liquid (that is, changing from an opaque condition before the intercalation to a transparent condition), and by a phenomenon of a viscosity of the scattering liquid increasing.

After intercalating parts of the acrylic group monomer, the polymerization initiator and the organic solvent between the layers of the organized lamellar clay mineral, the organic solvent is removed and the dispersing liquid is carried out with the polymerizing reaction. The organic solvent is removed by a heat drying, a pressure reduction drying or a spray drying, whereby the organic solvent in the mixture is almost taken away. In case the organic solvent remains in the composite material after polymerization, problems easily occur at using about corrosion, contamination caused by volatilization or reduction of transparency, and so it is desirable to remove the organic solvent as possible.

Multifunctional (meth) acrylate having more than two of (meth) acryloyl group may be added, if necessary, as cross-linking agents for heightening cohesive force of the composite material into molecule of the mixture prior to removing the organic solvent. As the multifunctional (meth) acrylate, enumerated are trimethylol propanetri (meth) acrylate, tentaerythritol tetra (meta) acrylate, 1,2-ethylene glycoldi (meta) acrylate, or 1,6-hexan dioldi (meta) acrylate.

The amount of the multifunctional (meta) acrylate is usually 0.02 to 5 wt parts, preferably 0.1 to 3 wt parts per 100 wt parts of acrylic group monomer, and it is desirable to be somewhat much in a case of two-function, and to be somewhat less in a case of multifunction. Being too small, the cross linking degree is low after the photo-polymerization and the above effects cannot be obtained, while being too much, the glass-break preventing effect is ready for reducing.

The polymerizing reaction is performed by the photo-polymerizing method of ultraviolet or the thermal polymerizing method in response to kinds of the polymerization initiators. From the viewpoint of workability into the sheet of the composite material, the photo-polymerizing method is specially preferable. For the photo-polymerizing method, desirably the polymerizing reaction is performed in an atmosphere substituted with an inert gas as $N_2$ gas and containing no oxygen or under a condition of shielding the air by an ultraviolet permeable film.

In the photo-polymerizing method, the ultraviolet is an electromagnetic radiation of a wave length being around 180 to 460 nm (nanometers), and an electromagnetic radiation of longer or shorter wave lengths is also sufficient. For a source of the ultraviolet, a radiation apparatus includes a mercury arc, carbon arc, low pressure mercury arc, middle-high pressure mercury lamp or metal halide lamp. Intensity of ultraviolet may be appropriately set by adjusting a distance till an object to be irradiated or voltage, and ordinarily 0.1 to 7 mw (milli-watt)/cm$^2$ is desirable in balance with irradiating time (productivity).

By performing the polymerizing reaction as above, the polymerization of the acrylic group monomer intercalated between the layers of the organized lamellar clay mineral also progresses together with progression of the polymerization of the acrylic group monomer, and the distance between the layers of the lamellar clay mineral is further enlarged in company with said progression. As a result, such a composite material is obtained which comprises the generated acrylic group resin and the organized lamellar clay mineral dispersed therein, and causes separation of the layers by intercalating parts of the acrylic group resin between the layers so that the distance between the layers is more than 100 Å.

That is, since this composite material is made by favorably scattering the clay mineral as fine and thin pieces of nm sizes in the acrylic group resin, the composite material is excellent in the glass-break preventing effect by reinforcing the clay mineral, and maintains transparency of high level, and in particular the clay mineral maintains the especially superior transparency in small sizes such as montmorillonite, saponite or hectorite.

It is possible to add to the composite material as needed, various kinds of additives of an adhesive agent, age resistor, or a coloring agent other than the acrylic group resin and organized lamellar clay mineral, so far as not spoiling the above mentioned characteristics.

In the composite material, it is good that the amount of the inorganic component is 3 to 25 wt %. Herein, the inorganic component designates an inorganic component (ordinarily, 80 to 30 wt % of the layer like mineral) of the organized lamellar clay mineral, and in case of adding an inorganic component other than the lamellar clay mineral, this inorganic component is also included. If this inorganic component is too little, the glass-break preventing effect is short, and if being excessive, the transparency goes down. The amount of the inorganic component can be demanded by the thermogravimetric analysis.

The glass-break preventing layer 11 is rendered to be a sheet by changing the composite material through suited means. For rendering to be the sheet, for example, the removal of the solvent and the polymerizing reaction are carried out on a removable supporter. That is, the sheet is rendered by mixing the organized lamellar clay mineral and the polymerization initiator together with the organic solvent into the acrylic group monomer, giving the external force, intercalating the acrylic group monomer, the polymerization initiator and the part of the organic solvent between the layers of the organized lamellar clay mineral, coating the mixture on the removable supporter, removing the solvent, and carrying out the polymerizing reaction.

As the above mentioned removable supporter, those are used, for example, where a plastic film as polyester film is performed on a surface thereof with a mold releasing treatment as a silicone treatment. The removable supporter is demanded to have an excellent surface smoothness. If the surface smoothness is poor, a surface condition of a sheet of the composite material provided thereon is worsened, a haze value increases, and the transparency decreases by light scattering. As a degree of the surface smoothness, a center line average height Ra is around 0.2 μm or less, and a maximum height Rmax is around 0.6 μm or less.

The thickness of the glass-break preventing layer 11 is 0.1 to 5 mm, especially preferably 0.5 to 3 mm. Being less than 0.1 mm, a shock moderating capacity goes down, the glass-break preventing effect of the plasma display plate is spoiled, and a problem is easy to appear about safety. Being more than 5 mm, a pasting work to the plasma display plate, in short, an attaching work is spoiled, the visuality goes down, the image shakes, and the brightness lowers.

The glass-break preventing layer 11 has one face side 11a for laminating the reflection preventing film 12 and an opposite face side (the other face side 11b) being an adhesive face, and by using this adhesion, the glass-break preventing layer 11 is easily pasted to the visual side of the plasma display plate 21. Herein, a degree of the adhesion is more than 0.5 N/25 mm width, preferably more than 1 N/25 mm width in 90° peeling adhesive force. For recycling, it is desirable that the glass-break preventing layer has removability ready for removal after having pasted. A degree of the re-peeking property 10 N/25 mm, preferably 8 N/25 mm width in 90° peeling adhesive force after having left 40 days at 80° C.

With the glass-break preventing layer 11 having these characteristics, it is possible to form the composite material of the acrylic group resin and the organized lamellar clay mineral as a structure of a single layer by selecting the composition of the acrylic group monomer in the above method so as to generate the acrylic group resin showing said adhesive force. Other than this single layered structure, it is also sufficient to form a layer composed of the composite material as a base layer, on which another adhesive layer-side having the removability is laminated for providing a structure of multi-layers. In this case, the reflection preventing film 12 is laminated on the base-side, and the adhesive layer-side having the removability is pasted to the visual side of the plasma display plate 21.

In the glass-break preventing film like filter 1, the reflection preventing film 12 is ordinarily laminated via its adhesion on one side 11a of the glass-break preventing layer 11 of the single layered or the multi-layered structure, and when directly attaching the filter 1 to the visual side of the plasma display plate 21, the filter serves as a reflection preventing function decreasing an external light for avoiding image displays of the plasma display apparatus from worsening.

As the reflection preventing film 12 showing such effects, the thickness ranges preferably 0.01 to 0.5 mm, especially preferably 0.05 to 0.3 mm, and ordinarily used are those treated with reflecting prevention in a plastic film as polyester film, so that a visible reflection is 5% or less, preferably 4% or less. In addition, also sufficient is such a reflection preventing film which is treated with anti-glare of the haise value being less than 5%.

As the reflection preventing treatment, it is possible to form a layer of low refraction being less than 1.50, preferably 1.45 or less. As organic materials, there are a partially or completely fluorinated alkyl ester of fluorine- containing polymer or (meth) acrylic acid, or fluorine-containing silicone. As inorganic materials, there are $MgF_2$, $CaF_2$ or $SiO_2$. Thickness of the layer of low refraction is ordinarily 1 μm or less, desirably 0.5 μm or less.

As another reflection preventing treatment, it is also possible to form a layer of high refraction (or a glare shielding layer of high refraction rate) being more than 1.5, preferably more than 1.6. As organic materials, there are those where urethane (meta) acrylate or polyester (meth) acrylate are polymerization-hardened, otherwise raw materials of silicon based, melamine based or epoxy based cross linking resins are bridge-hardened. As inorganic materials, there are materials where indium oxide as a main component is contained with a small amount of titanium dioxide, or $Al_2O_3$, MgO or $TiO_2$. Thickness of the layer is ordinarily 50 μm or less, desirably 10 μm or less.

The reflection preventing film 12 may be, if necessary, added with suitable functions of shielding electromagnetic waves or near infrared rays (800 to 1200 nm) in the film 12 itself, or of adjusting colors in visible ranges via coloring materials as dyes or pigments. It is also sufficient that a film having such a function has independently been made and is laminated adjacently to the reflection preventing film 12.

Figure 2:
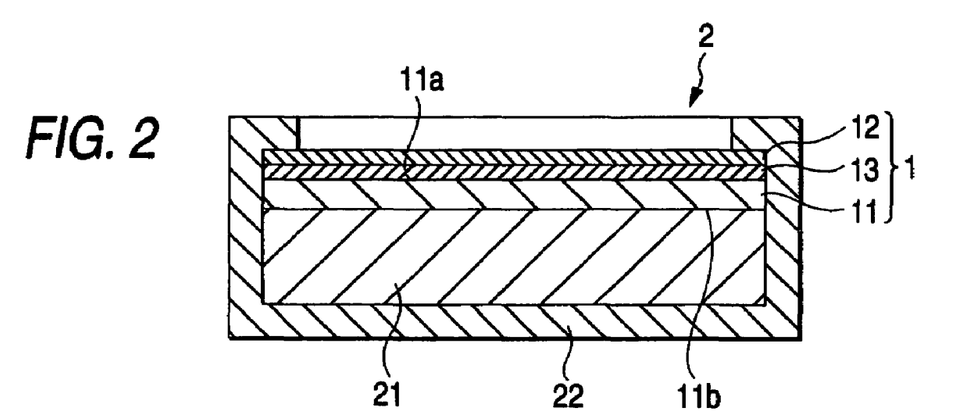
FIG. 2 shows a cross sectional view showing another example of the glass-break preventing film like filter according to the invention and the plasma display apparatus attached with the same.

FIG. 2 shows an example of the above mentioned laminated layers. For laminating the reflection preventing film 12 on one side 11a of the glass-break preventing layer 11, between the glass-break preventing layer 11 and the reflection preventing film 12, a functioning film 13 is laminated having the shielding function against the electromagnetic wave and/or the near infrared rays. The shielding effect as the electromagnetic wave shielding function is more than 10 dB, desirably 20 dB, and as the near infrared rays shielding function, the transmissivity of the near infrared rays is less than 20%, desirably less than 10%.

Some of the functioning film having the electromagnetic shielding function have surface resistant value being 5 Ω/□ or less in laminated multi-layers of metallic thin films and transparent thin films, metallic mesh electroless plated in a fabric, or patterned metallic mesh. The electromagnetic shielding layer necessitates an earth connection with a plasma display body, and this connection does not especially require any limitation, as far as a method is capable of the earth connection to the main body such as a metallic paste or a conductive tape. The functioning film having the near infrared lays includes a film of utilizing selection and absorption by colors, a film laminated multi-layers of metallic thin films and transparent thin films, or a film of phosphoric acid based acrylic resin.

As to the thickness of the functioning film 13, a thickness in total with the reflection preventing film 12 ranges 0.01 to 0.5 mm, desirably 0.05 to 0.3 mm not to hinder the effect of the invention.

As the functioning film, other than the shielding function against the electromagnetic wave and/or the near infrared rays, for heightening re-production of color of the plasma display, such a functioning film may be employed which selectively absorbs Ne emission of a plasma display sealing gas, or amends colors so that permeable colors turn out neutral gray or neutral blue.

The glass-break preventing film like filter 1 comprises the above mentioned structure, and since the glass-break preventing layer 11 maintains the high transparency as said, as a whole of the filter of the glass-break preventing layer 11 and the reflection preventing film 12 (or this and the functioning film 13), the glass-break preventing film like filter 1 shows the transparency of the high level such as the transmissivity of total light is 80% or more, preferably 90%, or more.

The plasma display apparatus 2 is directly pasted and attached with the glass-break preventing film like filter 1 composed as mentioned above by use of the adhesive face of the face-side (the other face-side 11b) opposite to one face-side 11a laminated with the reflection preventing film 12 (or this and the functioning film 13), to the visual side of the plasma display plate 21 composed of one-sheet glass or two-sheet glass.

By attaching the filter 1 to the display plate 21, the external shock to the display 21 is absorbed and moderated by the glass-break preventing layer 11 of the filter 1, thereby to effectively avoid glass breaking by the external shock to the display 21. This is assumed that an external impact energy is scattered to the boundary between the organic high polymer substance composing the glass-break preventing layer 11 and the organized lamellar clay mineral, and is dispersed as an energy taken to an adhesion destruction or a bondage destruction.

Besides, as the filter 1 is directly attached to the plasma display plate 21, an air layer found the related art is absent and no problem about double images caused thereby occurs. Further, the filter 1 is composed by laminating the reflection preventing film 12 (or this and the functioning film 13) of comparatively thin thickness and light weight, and so the attachment is easy, largely contributing to light weighing, thin size and low cost of the display apparatus. In addition, the adhesive face of the other face-side 11b in the glass-break preventing layer 11 of the filter is made the structure having the removability, and for wasting display units, the removal is possible, and removal is easy.

Next, describing Examples of the invention, specific reference will be made. In the following, "part or parts" mean "weight part or weight parts".

EXAMPLE 1

<Preparation of Organized Lamellar Clay Mineral>

The saponite based lamellar clay mineral (cation exchanging amount of 90 meq/100 g) of 20 g was agitated and scattered in a distilled water of 400 g. The quaternary ammonium salt of 47.3 g (in the formula, $R^1$ to $R^3$ are methyl group, and n is 25) having polyoxypropylene group expressed by the following formula (1), the water of 100 g and ethanol of 100 g were uniformly mixed, added into the dispersing liquid of the lamellar clay mineral, and agitated at 30° C. for 1 hour.

Then, the temperature of the scattering liquid increased to 80° C. and a precipitated solid was filtered. The water content was dried by freezing and the wax like organized lamellar clay mineral was obtained.

The distance between the layers of the thus obtained organized lamellar clay mineral was 42 Å by the X-ray scattering analysis. The amount of the organic ammonium ion in the organized lamellar clay mineral was 60 wt % as a result of the thermogravimetric analysis.

<Production of Glass-Break Preventing Film Like Filter>

The above organized lamellar clay mineral of 33.6 g, acrylic acid 2-ethyl hexyl ester of 80 g, 1-hydroxy cyclohexyl phenyl keton as the photopolymerization initiator ("IRGACURE 184" made by Chiba Special Chemicals Corporation) of 0.2 g, and toluene of 350 g were mixed for two hours in a three-one-motor to be the scattering liquid. This scattering liquid was treated for about three minutes at an irradiation intensity of 500 W by a supersonic wave scattering machine (made by Nihon Seiki Corporation), and given the external action.

As a result of the X-ray scattering analysis, a peak of 42 Å of the organized lamellar clay mineral faded away, and observed was a peak showing a broad flare toward a low angle side exceeding 100 Å. It was confirmed therefrom that parts of the acrylic group monomer, the photopolymerization initiator and the organic solvent were intercalated between the layers of the organized lamellar clay mineral.

To the external action-added transparent scattering liquid, trimethylol propane triacrylate of 0.2 parts was added as the cross linking agent per 100 parts of the monomer, and uniformly dissolved. This was coated as the removable supporter on the polyethylene tere phthalate film of 50 μm thickness with silicone-mold releasing treatment (referred to as "mold releasing treated PET film" hereafter; center line average height Ra: 0.06 μm and maximum height Rmax: 0.3 μm), and carried out with the solvent-removing treatment for evaporating the organic solvent in a dryer. Then, the above coated face was coated with the mold releasing treated PET film similarly as mentioned above, and was irradiated with ultraviolet of 900 mj/cm$^2$ by a high pressure mercury lamp of light intensity being 5 mmw/cm$^2$ for obtaining the photo polymerization.

In such manners, the base layer of 0.8 mm thickness was produced which comprised the transparent composite material containing the acrylic group resin (dynamic storage shearing elastic modulus at 20° C.: $3.0 \times 10^4$) and the organized lamellar clay mineral dispersed therein on the removable supporter and causing the separation of the layers by intercalating the part of the above resin between the layers of the clay mineral. The broad peak at the low angle side observed through the scattering liquid prior to the photo polymerization by the X-ray scattering analysis further decreased, and the separation of the layers of the organized lamellar clay mineral more progressed, and it was confirmed that the distance between the layers largely exceeded 100 Å.

The thus produced base layer as the glass-break preventing layer of the single layered structure was pasted at one side thereof with polyethylene terephthalate film ("RealookAS-1200" made by Nippon Oils transmissivity of total light Fats Co., Ltd.) treated with the reflection prevention of 0.1 mm thickness and at reflection being 4% or less, and the glass-break preventing film like filter was produced.

EXAMPLE 2

Excepting that the using amount of the organized lamellar clay mineral was changed to 9.6 g, and the using amount of toluene was changed to 50 g, the glass-break preventing film like filter was produced similarly to Example 1.

EXAMPLE 3

Excepting that the using amount of the organized lamellar clay mineral was changed to 64 g, and the using amount of toluene was changed to 280 g, the glass-break preventing film like filter was produced similarly to Example 1.

EXAMPLE 4

The organized lamellar clay mineral obtained in Example 1 of 20 g, acrylic acid isononyl ester of 80 g, the photopolymerization initiator similar to that of Example 1 of 0.2 g and toluene as the organic solvent of 150 g were mixed for two hours in the three-one-motor, and the scattering liquid was made. This scattering liquid was treated at the irradiating intensity of 500 W for three minutes in the supersonic wave scattering machine similar to that of Example 1, and was added with the external action.

As a result of the X-ray scattering analysis, a peak of 42 Å of the organized lamellar clay mineral faded away, and observed was a peak showing a broad flare toward a low angle side exceeding 100 Å. It was confirmed therefrom that parts of the acrylic group monomer, the photopolymerization initiator and the organic solvent were intercalated between the layers of the organized lamellar clay mineral.

To the external action added transparent scattering liquid, the cross linking agent was added per 100 parts of the monomer, and uniformly dissolved similarly to Example 1. This scattering liquid was coated on the removable supporter composed of the mold releasing treated PET film similar to that of Example 1, and carried out with the solvent-removing treatment for evaporating the organic solvent in a dryer. Then, the above coated face was coated with the mold releasing treated PET film for obtaining the photo polymerization similarly in Example 1.

In such manners, the base layer of 0.8 mm thickness was produced which comprised the transparent composite material containing the acrylic group resin (dynamic storage shearing elastic modulus at 20° C.: $8.9 \times 10^3$) and the organized lamellar clay mineral dispersed therein on the removable supporter and causing the separation of the layers by intercalating the part of the above resin between the layers of the clay mineral. The broad peak at the low angle side observed through the scattering liquid prior to the photo polymerization by the X-ray scattering analysis further decreased, and the separation of the layers of the organized lamellar clay mineral more progressed, and it was confirmed that the distance between the layers largely exceeded 100 A.

The base layer was pasted to one face-side with the reflection preventing film of −0.1 mm thickness (the same as in Example 1) and to the other face-side with the adhesive layer having the removability of 0.025 mm. By composing the glass-break preventing layer of the two layered structure with the adhesive layer having the removability and the base layer, the glass-break preventing film like filter was produced.

The above mentioned adhesive layer having the removability is an adhesive layer having a main component of acrylic resin of a monomer composition being acrylic acid isooctyl ester/hydroxyethylacrylate=100/1 (wt ratio), and such an adhesive layer was used which was dynamic storage shearing elastic modulus at 20° C. in simplex was $2 \times 10^4$ Pa.

COMPARATIVE EXAMPLE 1

The reflection preventing film of 0.1 mm thickness (the same as in Example 1) was used and was pasted with the adhesive layer having the removability of 0.025 mm (the same as in Example 4) and the glass-break preventing film like filter was produced.

COMPARATIVE EXAMPLE 2

A base layer was a hard acrylic plate of 0.1 mm thickness was pasted to one side-face with the adhesive layer of 0.025 mm (the thermoplastic urethane based elastomer "E3070A" made by Toyo Spinning Co., Ltd. was formed by a pressing machine), and was pasted with the reflection preventing film of the 0.1 mm thickness (the same as in Example 1) via said adhesive layer. The base layer was pasted to the other side-face with the adhesive layer having the removability of 0.025 mm thickness (the same as in Example 4).

Thus, the glass-break preventing film like filter was produced having the structure where the hard acrylic plate as the base layer was laminated with the reflection preventing film.

In a reactor equipped with a cooling pipe, an oxygen introducing pipe, a thermometer, an ultraviolet irradiator and a agitator, acrylic acid 2-ethyl hexyl ester of 100 parts, and 2,2-dimethoxy-2-phenyl acetophenone of 0.1 parts were charged to which the ultraviolet was irradiated through the ultraviolet irradiator, and the above monomer of 10 wt % was polymerized to obtain a consistency liquid. To this consistency liquid, the same cross linking agent as that of Example 1 of 0.2 parts and the same photopolymerization initiator as said above of 0.1 parts were added and uniformly dissolved and mixed.

Subsequently, this mixture was coated on the removable supporter of the same mold-release treating PET film as in Example 1, and was irradiated with ultraviolet of 2000 mj/cm$^2$ for obtaining the photo polymerization, and the base layer of 0.8 mm thickness of the adhesive acrylic group resin was produced. This base layer as the glass-break preventing layer of the single layered structure was pasted at one side thereof with the reflection preventing film of 0.1 mm thickness (the same as in Example 1), and the glass-break preventing film like filter was produced.

In Examples 1 to 4 and Comparative Examples 2 and 3, as to the base layers composing the glass-break preventing layer (the hard acrylic plate in Comparative Example 2), dynamic storage shearing elastic modulus at 20° C. and the contents of the inorganic components in the base layers were measured by the following method. Results are as shown in Table 1.

<Dynamic Storage Shearing Elastic Modulus>

By means of a visco-elastic spectrometer (ARES apparatus made by Leometric-Scientific Inc.), temperature distributions were measured at frequency 1 Hz for obtaining dynamic storage shearing elastic modulus at 20° C.

<Content of Inorganic Component>

The base layer was weighed in predetermined amount (10 mg), and change in weight was found within ranges of room temperatures to 900° C. by means of the thermogravimetric analyzer ("TGA" made by Seiko Electronics). At higher than 600° C., the change in weight was substantially naught, and by regarding the residual weights at this time as weights of inorganic components, the rates (wt %) for initial weights were obtained.

TABLE 1

| | Dynamic storage shearing elasticity (Pa) at 20° C. | Contents of inorganic components (wt %) |
|---|---|---|
| Example 1 | $1.8 \times 10^6$ | 12.0 |
| Example 2 | $2.0 \times 10^5$ | 4.0 |
| Example 3 | $7.0 \times 10^6$ | 19.0 |
| Example 4 | $7.1 \times 10^5$ | 8.1 |
| Com. 2 | $3.0 \times 10^8$ | 0 |
| Com. 3 | $3.0 \times 10^4$ | 0 |

Com.: Comparative Example

As to the respective filters in Examples 1 to 4 and Comparative Examples 1 to 3, measurements were made by the following method to the shock resistance, the 90° peeling-adhesive force (removability) and the transmissivity of total light. Results are as shown in Table 2.

<Shock Resistance>

The metal plate was thereon mounted with and in the order of the silicone sheet of 1 mm thickness and the plasma displaying glass plate of 2.8 mm thickness ("PD200" made by Asahi Glass Co., Ltd.), and the filter was thereon pressed and pasted to the adhesive face (having the removability) opposite to the laminating side of the reflection preventing film.

Onto this filter, a steel ball of 50 mm diameter and 510 g weight was dropped from the height of 20 cm for investigating break or non-break of the plasma display glass plate. Evaluations were ○ for non-break, and X for break. The striking energy at dropping the steel ball was found by weight (kg) of the steel ball×height (m)×9.8 (m/s$^2$)=0.51× 0.2×9.8, and was about 1.0 J.

<90° Peeling-Adhesive Force>

The filter was cut into 25 mm width, and the adhesive face (having the removability), and the adhesive face (having the removability) opposite to the laminating side of the reflection preventing film was pressed and pasted to the plasma displaying glass plate of 2.8 mm thickness ("PD200" made by Asahi Glass Co., Ltd.). This filter was left in the atmosphere at 80° C. for 40 days, taken out, placed at 23° C. for four hours, peeled in the 90° direction at the rate of 50 mm/min, and the adhesive force at this time was measured.

<Transmissivity of Total Light>

The adhesive face (having the removability) opposite to the laminating side of the reflection preventing film of the filter was pasted to the slide glass, and the transmissivity of total light was measured by a reflection-transmissivity gauge ("HR100 Type" made by Murakami Color Technique Institute).

TABLE 2

|  | Shock resistance | Adhesive strength of 90° C. separation (N/25 mm width) | Transmissivity (%) of total light |
|---|---|---|---|
| Example 1 | ○ | 1.2 | 92.0 |
| Example 2 | ○ | 3.8 | 92.8 |
| Example 3 | ○ | 0.7 | 90.5 |
| Example 4 | ○ | 2.0 | 91.0 |
| Com. 1 | X | 2.5 | 93.7 |
| Com. 2 | X | Impossible to measure | 93.5 |
| Com. 3 | X | 5.0 | 93.1 |

Com.: Comparative Example

As is seen from the above, according to the glass-break preventing film like filter of the invention set forth in Examples 1 to 4, it can be easily pasted to the glass plate making use of the adhesive face, and the removal is also easy after pasting, and it is seen that the excellent glass-break preventing effect is available in comparison with the film like filter in Comparative Example 1 without the glass-break preventing layer (the base layer thereof).

In contrast, in the filter of Comparative Example 2 with the base of the hard acrylic plate whose transmissivity of total light at 20° is out of the inventive range, the glass-break preventing effect is not available. In the filter of Comparative Example 3 not containing the organized lamellar clay mineral in the glass-break preventing layer, a satisfactory glass-break preventing effect is not yet available.

As mentioned above, the invention laminates the reflection preventing film on one side of the glass-break preventing layer comprising the composite material of the transparent organic high polymer substance and the organized lamellar clay mineral, and makes the other side adhesive, whereby the glass-break preventing film like filter may be directly attached to the visual side of the plasma display plate, making use of the adhesive face, so that the shock resistance of the display apparatus is heightened, the glass-break preventing effect of the plasma display plate is increased, and besides because of directly attaching, no problem occurs of double images owing to the air layer, and further not necessitating a transparent protecting plate such as a hard and thick glass plate or acrylic plate, attachment is easy, contributing to light weighing, thin size and low cost of the display apparatus, and with the structure of making the adhesive side having the removability, it is possible to offer the glass-break preventing film like filter and the plasma display apparatus attached with the same, enabling the removal and easily detaching.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A glass-break preventing film filter, comprising:
a reflection preventing film; and
a glass-break preventing layer comprising:
an adhesive layer comprising:
a composite material of a transparent organic polymer substance; and
an organized lamellar clay mineral,
said reflection preventing film being laminated on a first side of said glass-break preventing layer, and
a second side of said glass-break preventing layer comprising an adhesive face,
wherein portions of the transparent organic polymer substance are intercalated between layers of the organized lamellar clay mineral,
wherein an amount of said organized lamellar clay mineral includes a range of from 10 to 150 parts by weight for 100 parts by weight of said transparent organic polymer substance,
wherein said transparent organic polymer substance comprises an acrylic-based resin,
wherein said acrylic-based resin comprises an acrylic-based resin synthesized at least from a (meth) acrylic acid alkyl ester of 70–100 wt % and a monoethylene unsaturated monomer of 0–30 wt %, the monoethylene unsaturated monomer being capable of copolymerization with the (meth) acrylic acid alkyl ester,
wherein the organized lamellar clay mineral includes an organic onium ion of 20–70 wt %, and
wherein the adhesive face of the glass-break preventing layer comprises a removable adhesive face, wherein the removable adhesive face has a 90° peeling adhesive force of 0.7–10 N/25 mm width after 40 days at 80° C.

2. A glass-break preventing film filter according to claim 1, wherein the organic polymer substance has a dynamic storage shearing elastic modulus at 20° C. which is equal to or less than $6 \times 10^6$ Pa.

3. A plasma display apparatus, wherein a plasma display plate is directly attached on a visual side thereof with the glass-break preventing film filter as set forth in claim 2 via the adhesive face of the glass-break preventing layer.

4. A glass-break preventing film filter according to claim 1, wherein a glass-break preventing layer has a thickness of 0.1 to 5 mm.

5. A plasma display apparatus, wherein a plasma display plate is directly attached on a visual side thereof with the glass-break preventing film filter as set forth in claim 4 via the adhesive face of the glass-break preventing layer.

6. A glass-break preventing film filter according to claim 1, wherein the glass-break preventing film filter has transmissivity of total light which is equal to or greater than 80%.

7. A plasma display apparatus, wherein a plasma display plate is directly attached on a visual side thereof with the glass-break preventing film filter as set forth in claim 6 via the adhesive face of the glass-break preventing layer.

8. A plasma display apparatus, wherein a plasma display plate is directly attached on a visual side thereof with the glass-break preventing film filter as set forth in claim 1 via the adhesive face of the glass-break preventing layer.

9. The glass-break preventing film according to claim 1, wherein a glass-break preventing layer has a thickness of 0.5 to 3 mm.

10. The glass-break preventing film according to claim 1, further comprising:
a shielding film laminated on the reflection preventing film,
wherein said shielding film shields the glass-break preventing layer from at least one of electromagnetic waves and near infrared light.

11. The glass-break preventing film filter according to claim 1, wherein a distance between said layers of the organized lamellar clay mineral is greater than 100 Å.

12. A plasma display apparatus, comprising:
a plasma display plate; and
a glass-break preventing film filter comprising a reflection preventing film and a glass-break preventing layer,
wherein said glass-break preventing layer comprises:
a composite material comprising a transparent organic polymer substance; and
an organized lamellar clay mineral.

13. The plasma display apparatus according to claim 12, wherein said reflection preventing film is laminated on a first side of said glass-break preventing layer, and
wherein a second side of said glass-break preventing layer comprises an adhesive face.

14. The plasma display apparatus according to claim 12, wherein the glass-break preventing film is directly attached to the plasma display plate.

15. The plasma display apparatus according to claim 14, wherein said reflection preventing film is laminated on a first side of said glass-break preventing layer, and
wherein a second side of said glass-break preventing layer comprises an adhesive face.

16. The plasma display apparatus according to claim 12, wherein the glass-break preventing film is attached to the plasma display plate, and
wherein a boundary between the glass-break preventing film and the plasma display plate is devoid of air.

17. The plasma display apparatus according to claim 16, wherein said reflection preventing film is laminated on a first side of said glass-break preventing layer, and
wherein a second side of said glass-break preventing layer comprises an adhesive face.

18. A glass-break preventing film filter, comprising:
a reflection preventing film; and
a glass-break preventing layer for preventing double images,
said glass-break preventing film filter comprising a transmissivity of total light being greater than or equal to 80%,
said glass-break preventing layer comprising:
a composite material of a transparent organic polymer substance; and
an organized lamellar clay mineral,
said reflection preventing film being laminated on a first side of said glass-break preventing layer, and
a second side of said glass-break preventing layer comprising an adhesive face,
wherein portions of the transparent organic polymer substance are intercalated between layers of the organized lamellar clay mineral,
wherein said glass-break preventing layer is devoid of birefringent properties.

* * * * *

UNITED STATES PATENT AND TRADEMARK OFFICE
CERTIFICATE OF CORRECTION

| | |
|---|---|
| PATENT NO. | : 7,214,422 B2 |
| APPLICATION NO. | : 10/288441 |
| DATED | : May 8, 2007 |
| INVENTOR(S) | : Yukiko Azumi et al. |

It is certified that error appears in the above-identified patent and that said Letters Patent is hereby corrected as shown below:

Title page,

Item (56) References Cited,
U.S. PATENT DOCUMENTS,
insert --6,960,875, 01/2003, Morimoto, et al.--

Signed and Sealed this

Second Day of October, 2007

JON W. DUDAS
*Director of the United States Patent and Trademark Office*